(12) United States Patent
Chaudhari et al.

(10) Patent No.: US 6,593,586 B2
(45) Date of Patent: Jul. 15, 2003

(54) METHOD AND APPARATUS FOR MAKING A CRYSTAL ALIGNMENT LAYER

(75) Inventors: Praveen Chaudhari, Briarcliff Manor, NY (US); Eileen Ann Galligan, Fishkill, NY (US); James Patrick Doyle, Bronx, NY (US); James Andrew Lacey, Mahopac, NY (US); Shui-Chih Alan Lien, Briarcliff Manor, NY (US); Hiroki Nakano, Shiga (JP); Minhua Lu, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/930,934

(22) Filed: Aug. 16, 2001

(65) Prior Publication Data

US 2002/0001057 A1 Jan. 3, 2002

Related U.S. Application Data

(62) Division of application No. 09/548,990, filed on Apr. 14, 2000.
(51) Int. Cl.⁷ .............................................. G02F 1/1337
(52) U.S. Cl. ..................... 250/492.3; 430/320
(58) Field of Search ....................... 250/492.3; 430/320; 349/129

(56) References Cited

U.S. PATENT DOCUMENTS

| | | | |
|---|---|---|---|
| 5,486,403 A | * 1/1996 | Ishitaka et al. ............. 428/167 |
| 5,770,826 A | 6/1998 | Chaudhari et al. | |
| 6,061,114 A | * 5/2000 | Callegari et al. ............ 349/125 |
| 6,061,115 A | * 5/2000 | Samant et al. .............. 349/129 |
| 6,124,914 A | * 9/2000 | Chaudhari et al. .......... 349/129 |
| 6,313,896 B1 | * 11/2001 | Samant et al. .............. 349/124 |

FOREIGN PATENT DOCUMENTS

| JP | 7-056172 | 3/1995 |
|---|---|---|
| JP | 9-244027 | 9/1997 |
| JP | 11-160711 | 6/1999 |

* cited by examiner

*Primary Examiner*—John R. Lee
*Assistant Examiner*—Anthony Quash
(74) *Attorney, Agent, or Firm*—Ohlandt, Greeley, Ruggiero & Perle, L.L.P.; Daniel P. Morris

(57) ABSTRACT

A method is disclosed for forming an alignment layer for use in a liquid crystal cell layer for use in a liquid crystal cell using an ion beam source that includes the steps of: (1) providing a substrate having a surface; (2) providing an ion beam source that emanates an ion beam; (3) providing a mask layer disposed between the substrate surface and the ion beam source. The mask layer has at least two openings disposed between the ion beam source and the substrate surface. The shape and position of the openings reduce the irregularity of the beam exposure in a border region on the surface of the substrate resulting from the ion beam source. The present invention may be used in conjunction with substrate treatment using multiple sweeps with a single ion beam source, or with a substrate treatment using a single sweep with multiple ion beam sources. Also disclosed is an apparatus for practicing the disclosed method.

7 Claims, 11 Drawing Sheets

METHOD AND APPARATUS FOR MAKING A CRYSTAL ALIGNMENT LAYER

This is a divisional of U.S. patent application Ser. No. 09/548,990, filed Apr. 14, 2000.

BACKGROUND OF THE INVENTION

1. Field of the Invention

The present invention relates in general to liquid crystal displays. In particular, the present invention relates to preparation methods for preparing alignment surfaces for the liquid crystal material that forms a portion of a liquid crystal display.

2. Description of the Related Art

Liquid crystal display technology is used worldwide in a variety of products ranging from watches through cellular phones to computers. The revenue associated with this industry is estimated to be several billion dollars annually.

An essential requirement, in the manufacture of liquid crystal displays, is the alignment of the liquid crystal molecules by controlling the surfaces within which the liquid crystal layer is sandwiched. The pervasive method for achieving this is to use a polyimide coated surface and to then rub the coated surface with a velvet cloth. This rubbing process realigns the polyimide surface and produces alignment of the liquid crystal molecules in contact with the surface. The two rubbed surface then produces alignment of the liquid crystal cell in a desired way. This rubbing method has been the process of choice for the last three decades of manufacturing displays. However, its been recognized by the industry that a non contact or a non rubbed method of surface alignment is very desirable for future manufacturing, since the rubbing method introduces debris from the cloth in an otherwise clean room environment. The rubbing method can also lead to electrostatic charge build up, which can destroy the transistors below the polyimide surface. Since these transistors are essential for the operation of modem liquid crystal display devices, it is important for the LCD industry to find new methods of providing alignment surfaces that do not risk the integrity of such transistors.

U.S. Pat. No. 5,770,826 to Chaudhari et al. teaches that low energy ion beams can be used to modify the surface of a wide class of materials so that the surface develops a directionality. This directionality, or orientational order, then aligns liquid crystal molecules. It has also been demonstrated that such alignment surfaces formed by non-contact ion beam methods can be used to build liquid crystal display panels. Non-contact ion beam "guns" are available commercially.

A strong driving force in liquid crystal display technology is the cost of manufacturing. One approach to reducing cost, for a given manufacturing technology, is to increase the size of the glass substrate. This enables many displays to be manufactured almost simultaneously, thus reducing the cost per unit.

To achieve the desired uniformity of alignment on the surface of the alignment layer, it is important to have ion beam gun uniformity with respect to the emitted beam, and particularly with respect to beam divergence. The glass substrate, on which the displays are to be built, is rectangular in shape. In the past, beam divergence of the ion beam and the rectangular shape of the glass substrate placed limits on the geometrical shape of the ion beam gun. Specifically, prior art ion beam guns are longer in one direction (e.g., rectangular) and, in order to cover the entire glass substrate, the glass substrate is moved relative to the ion gun to irradiate the full surface of the glass substrate. This is called a scan mode.

As the LCD market develops, it is desirable to manufacture as many LCD's as possible in the most cost effective manner. In a manufacturing line, this would be achieved by increasing the square surface area of substrate processed during the scan mode. One avenue to increase productivity is to increase the amount of glass substrate irradiated in each sweep of the scan mode. Commercially available ion guns are about 70 cm in length, but it is expected that the next generation of manufacturing lines will need to accommodate substrates having a length over twice that presently used. However, the rate limiting factor to increasing the size/length of substrates has been the inability to uniformly irradiate large surface areas of the substrate. One aspect of the difficulty presented has been maintaining uniformity in the border portion between two irradiated areas processed by either (1) two separate sweeps by the same ion gun or (2) one sweep of two adjacent ion guns.

It is possible to manufacture larger ion guns that can irradiate a larger surface area of the substrate per single sweep. However, developing and manufacturing such "mega-size" ion guns becomes more difficult and expensive as the substrate size increases. In fact, the cost associated with manufacturing large ion beam guns would offset any cost saving achieved by increasing the surface area of substrate irradiated. Thus, the foregoing solution leaves much to be desired.

A need exists for a cost-effective method to irradiate large surface areas of substrate while maintaining uniformity of the alignment surface.

SUMMARY OF THE INVENTION

The present invention, in brief summary, is a method of forming an alignment layer for use in a liquid crystal cell using an ion beam source that includes the steps of: (1) providing a substrate having a surface; (2) providing an ion beam source; and (3) providing a mask layer disposed between the substrate surface and the ion beam source. The mask layer has an opening disposed between the ion beam source and the substrate surface. The opening reduces the irregularity of the beam exposure in a border region on the surface of the substrate resulting from the ion beam source. The present invention may be used in conjunction with substrate treatment using multiple sweeps with a single ion beam source, or with a substrate treatment using a single sweep with multiple ion beam sources. The present invention also includes an apparatus for achieving the foregoing methods.

BRIEF DESCRIPTION OF THE SEVERAL VIEWS OF THE DRAWINGS

FIG. 2b illustrates a top plan view of the single ion source system of FIG. 2a;

FIG. 3b illustrated a top plan view of the dual ion source system of FIG. 3a;

FIG. 4b illustrates a top plan view of the overlapping dual source ion system of FIG. 4a;

FIG. 5b illustrates a top plan view of the dual source ion system of FIG. 5a;

DETAILED DESCRIPTION OF THE INVENTION

Figure 1:
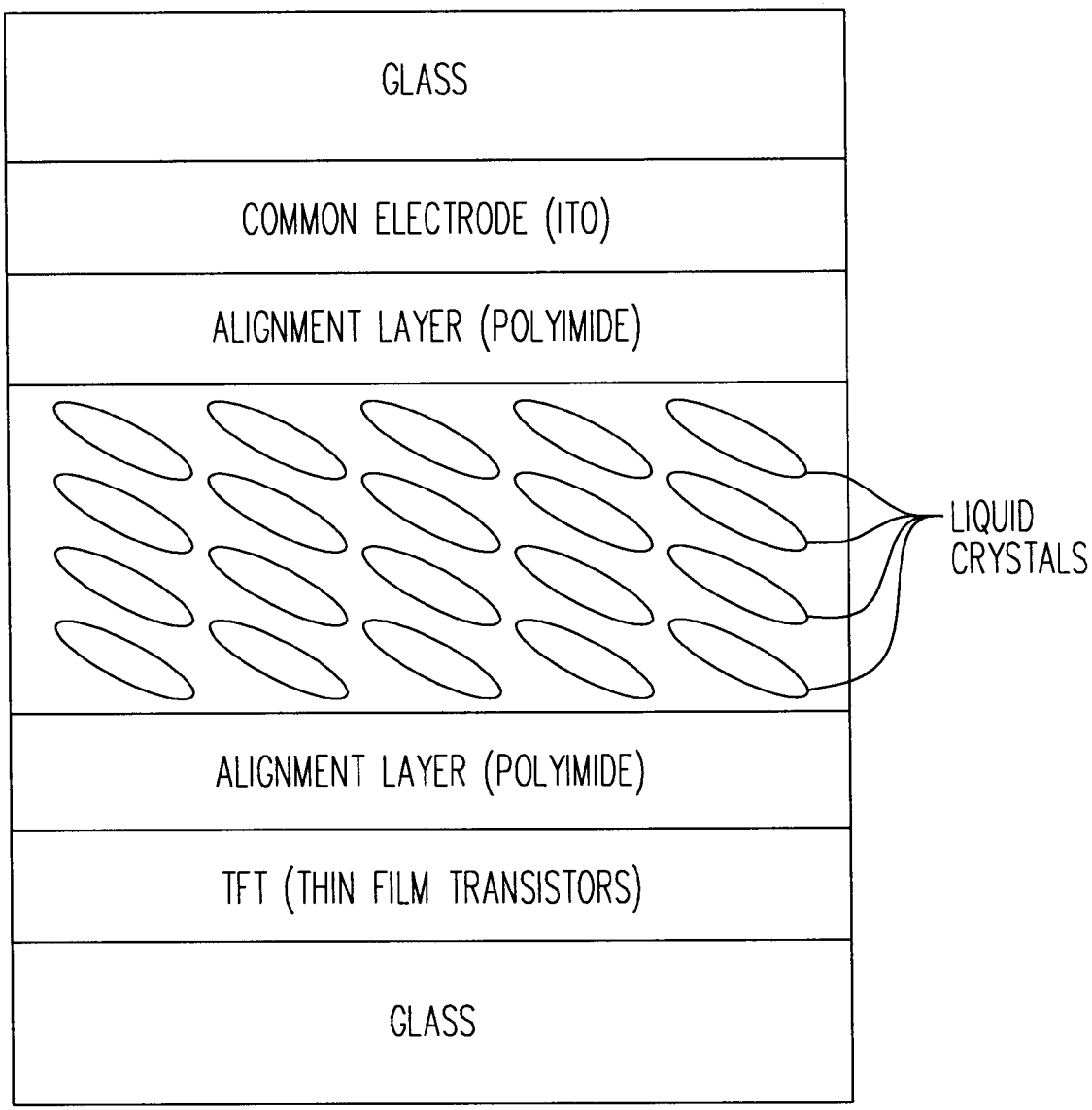
FIG. 1 illustrates a schematic cross-sectional drawing of an example of a typical liquid crystal display cell to which the present invention applies.

The disclosure of commonly assigned U.S. Pat. No. 5,770,826 to Chaudhari et al. is incorporated by reference in its entirety. FIG. 1 of U.S. Pat. No. 5,770,826 provides a schematic drawing of an example of an ion beam system useful for the purpose of practicing this invention.

The present invention provides a method of using an ion beam system having an ion beam source to enhance uniformity of alignment on a surface of a substrate. In particular, the problem solved by the present invention lies in the border region that results from either multiple sweeps with a single ion beam source or a single sweep with multiple ion beam sources.

FIG. 1 is a schematic diagram of a cross-section of a liquid crystal display cell. As illustrated in FIG. 1 the liquid crystals are disposed between two alignment layers, specifically between the alignment surfaces of two alignment layers. The quality of any liquid crystal display cell is dependent upon the uniformity of the alignment of the liquid crystal display. Hence, providing uniform alignment surfaces is a critical element to manufacturing liquid crystal display cells.

Although the difficulties associated with using multiple ion source guns is known by those skilled in the art and has been described above, reference is made to FIGS. 2a through 6 for providing better appreciation of these difficulties. In addition, the problem associated with multiple ion source guns is discussed below to assist those skilled in the art to appreciate the solution provided by the present invention.

To illustrate the principles of the present invention reference is made to using a diamond-like-carbon film (dlc) as the alignment layer. In addition, an Argon source ion gun is run between 100 and 500 eV. Typically, the ion source gun is positioned at a non-perpendicular angle to the surface of the alignment layer. In the examples and figures discussed below, the angle is 35 degrees from the horizontal, but this particular angle should not be viewed as a limitation upon the practice of this invention.

Figure 2A:
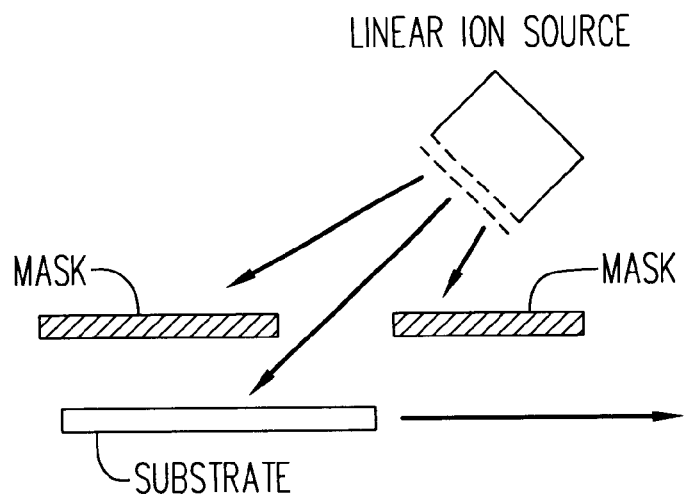
FIG. 2a illustrates a side plan view of a single ion source system.
Figure 2B:
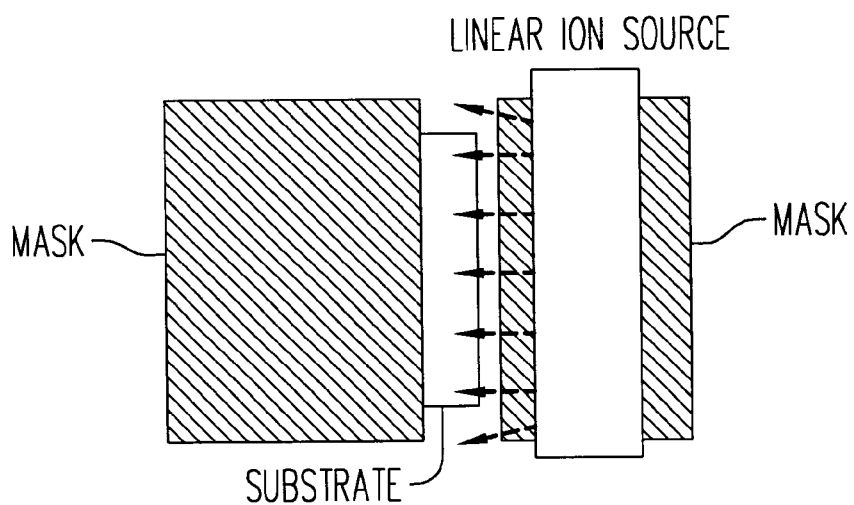

Reference is made to FIG. 2a, which illustrates a typical arrangement for a single ion source system. In such a single ion source system, the substrate is scanned under the gun by moving the glass substrate relative to the ion source gun. As can be appreciated from FIG. 2b, the surface area that can be treated by the ion source gun is limited by the size of the ion source gun.

Figure 3A:
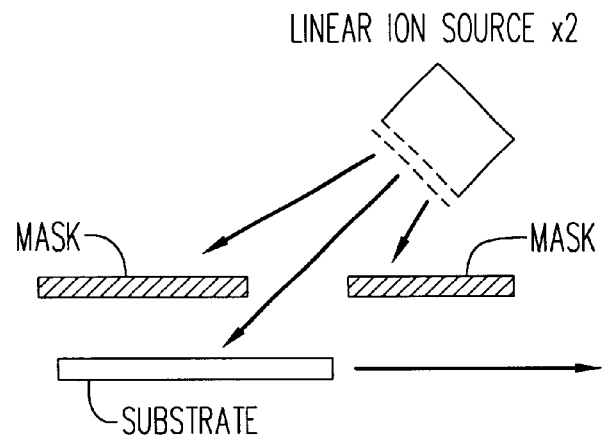
FIG. 3a illustrates a side plan view of a dual ion source with simple linear concatenation.
Figure 3B:
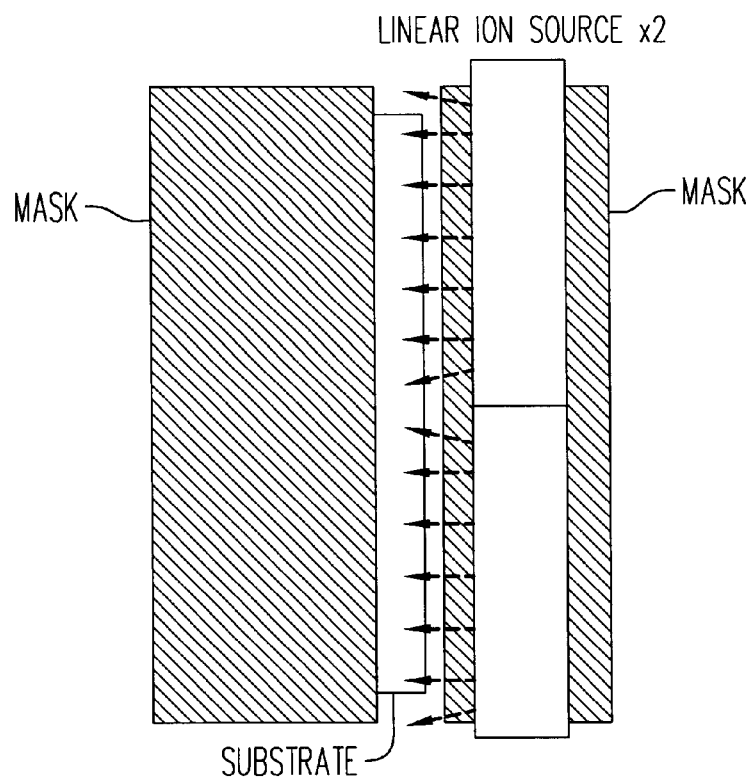

Reference is made to FIGS. 3a and 3b, which illustrate a dual ion gun source system. Since there are inherent variations from one ion source gun to another ion source gun, simply aligning two ion source guns in a linear fashion as illustrated in FIG. 3b will fail to produce the desired uniformity across the treated surface of the substrate, and, in particular, across the border area between the two ion source guns.

Figure 4A:
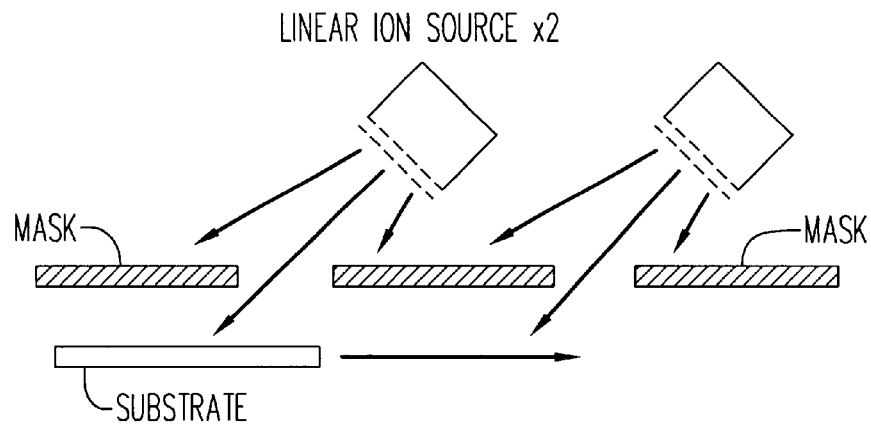
FIG. 4a illustrates a side view of a overlapping dual source ion system.
Figure 4B:
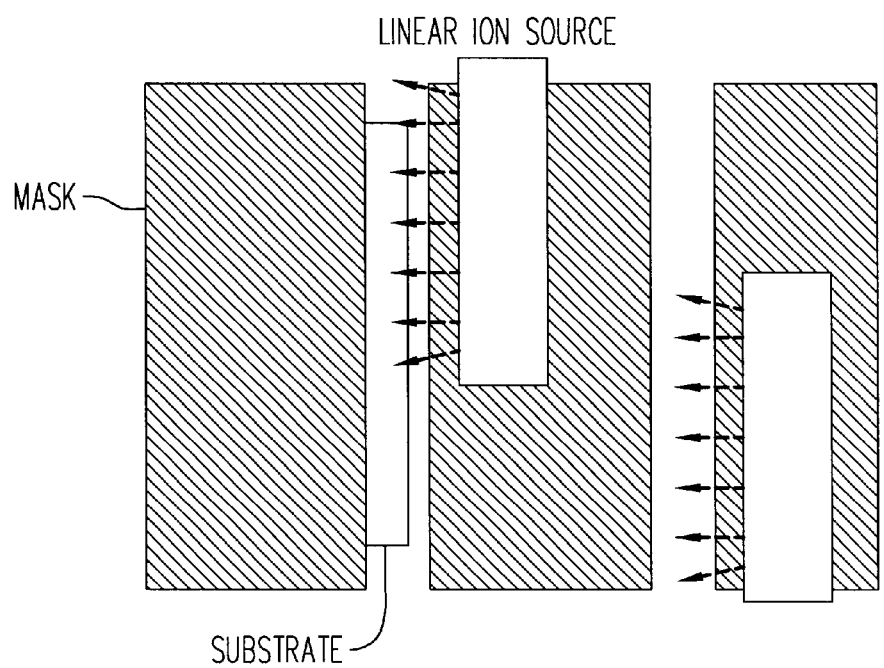

Reference can be made to FIGS. 4a and 4b, which illustrate a dual ion source system. As can be appreciated from FIG. 4b, the uniformity of the border portion is negatively affected by the overwrite effect of the second ion beam source in the border portion.

Figure 5A:
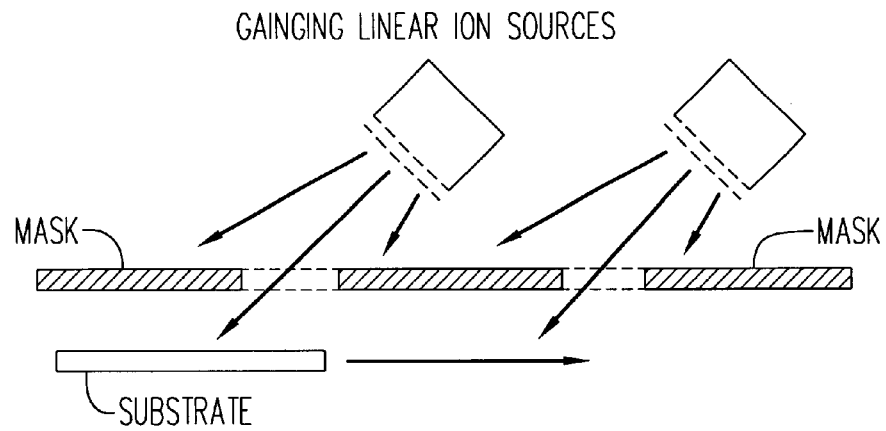
FIG. 5a illustrates a side plan view of a dual source ion system with overlapping concatenation.
Figure 5B:
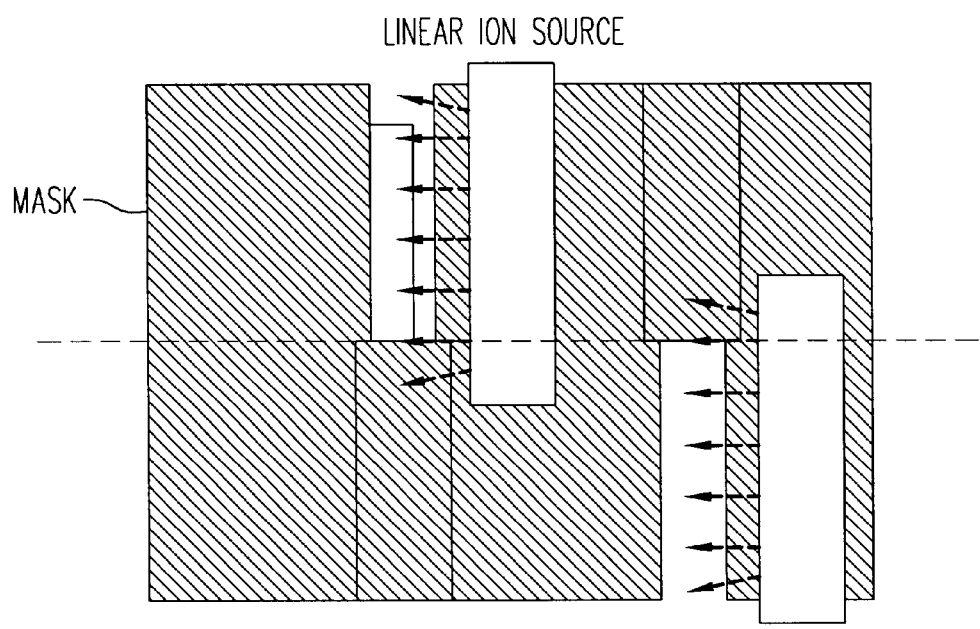

Reference can be made to FIGS. 5a and 5b, which illustrate another dual ion source system. The first ion source gun is positioned behind the second ion source gun, but the area of exposure of the two ion source guns overlaps at the border area. The mask illustrated in FIG. 5a illustrates one attempt to eliminate the overwrite effect in the border portion. As illustrated in FIG. 5b, the surface of the substrate is exposed to the ion beam source by a mask that is rectangular in shape, but shorter in length than its respective ion source gun. However, even if the masks is positioned so that a border area is eliminated, when the second ion source gun passes the surface area bombarded by the first ion source gun, the beam divergence of the second ion source gun will negatively affect the uniformity of the border area.

Figure 6:
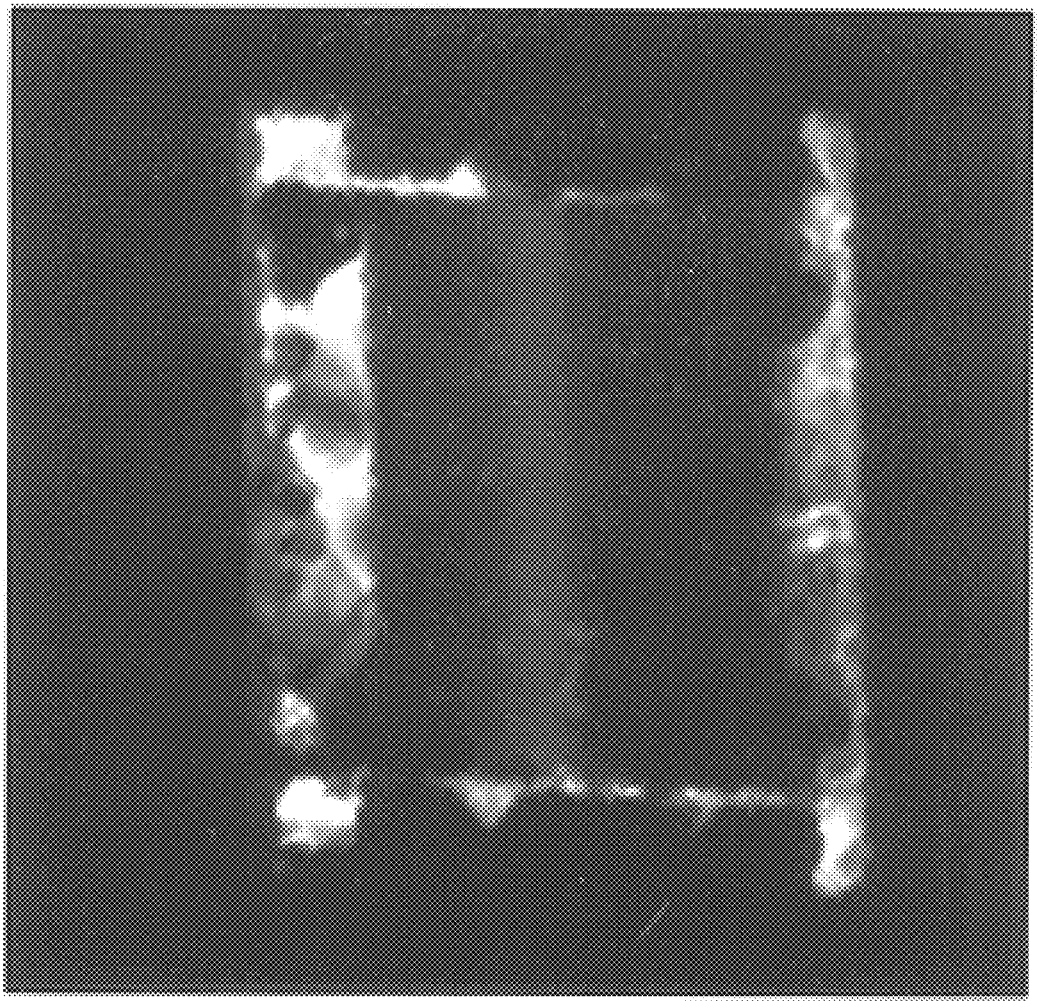
FIG. 6 illustrates a liquid crystal display cell prepared with the dual source ion system illustrated in FIGS. 5a and 5b.

FIG. 6 illustrates a liquid crystal display cell prepared with a dual ion source system as illustrated in FIGS. 5a and 5b. In the region where the exposure from the two guns overlap, the alignment can vary. This causes the liquid crystal to respond differently to light and visible contrast can be seen at the region of overlap.

Figure 7:
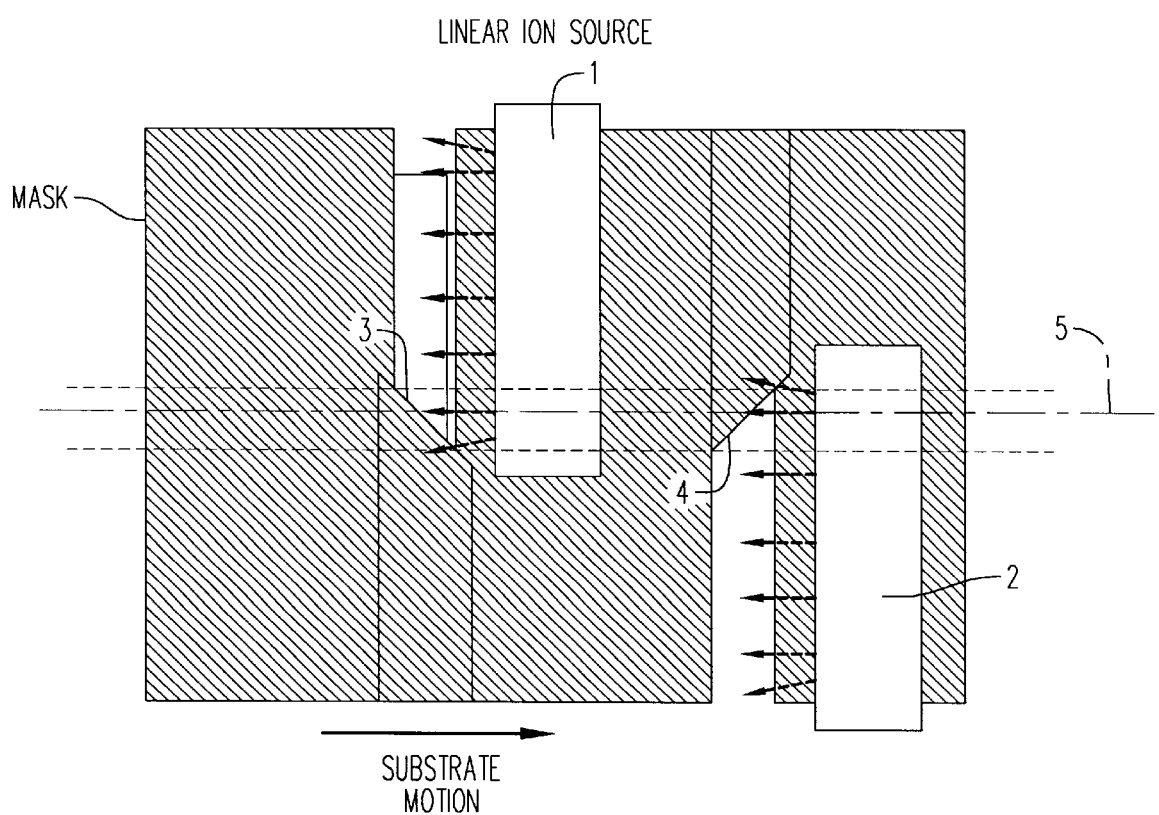
FIG. 7 illustrates a top plan view of a dual source ion system according to the present invention wherein the substrate moves from left to right.
Figure 8A:
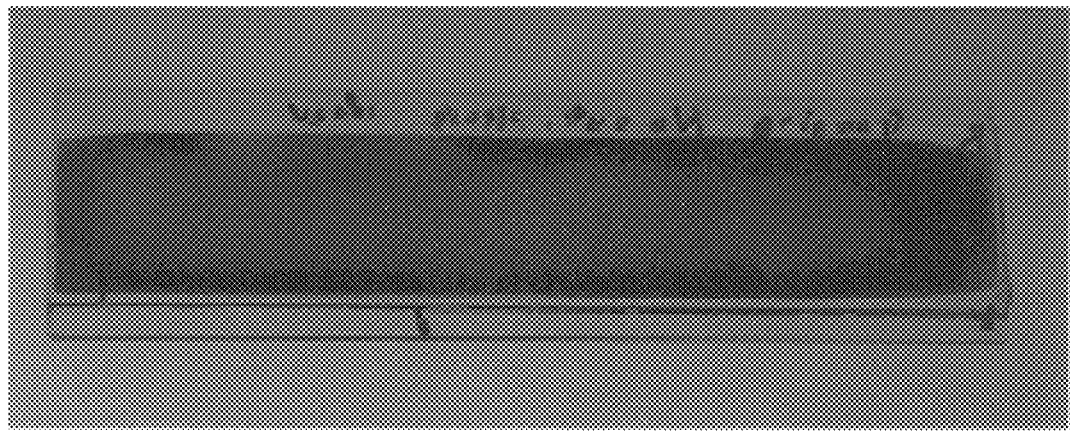
FIG. 8a illustrates a liquid crystal display cell made according to the present invention illuminated with a parallel polarizer.
Figure 8B:
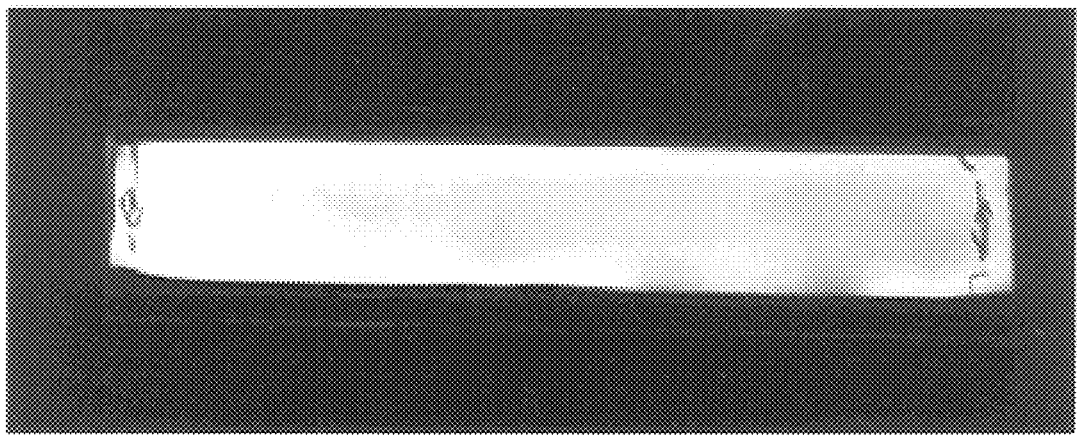
FIG. 8b illustrates the liquid crystal display cell according to the present invention of illuminated with a cross polarizer.

Reference can be made to FIG. 7, which illustrates a dual ion beam source according to the principles of the present invention. As illustrated in FIG. 7, the first ion beam gun 1 and a second ion beam gun 2 are aligned with overlapping concatenation, as in the dual ion source system illustrated in FIGS. 5a and 5b. However, in the dual ion source system of the present invention the ends 3, 4 of each mask that are proximate the border portion are shaped to accommodate the overlap region and to produce a surface alignment that has enhanced optical uniformity across the entire treated alignment surface as compared to prior art methods. The triangular portions of the mask layer allows a smooth transition from the first ion beam source 1 to the second ion beam source 2 in the overlap/border portion. The uniformity of alignment achieved by the present invention is exemplified by the liquid crystal display cells of FIGS. 8a and 8b. As demonstrated in FIGS. 8a and 8b, no boundary portion is observed. The quality of the uniformity of the liquid crystal display cell provided by the present cell is even more pronounced when compared with the liquid crystal display cell illustrated in FIG. 6.

As can be appreciated by comparing FIG. 5b to FIG. 7, to enhance the uniformity of surface exposure in the border region, the shape of the mask opening is modified in the border region. Although the substrate exposure illustrated in FIG. 7 is modified by a triangular-pattern of exposure in the border portion, this particular modification should not be viewed as a limitation upon the practice of the present invention. Thus, in addition to modifying the substrate exposure with triangular openings illustrated and discussed herein, it will be apparent to those skilled in the art that that the openings may be configured not only as a triangle, but also using sine curves, Gaussian curves, and other substrate exposure modification means. For example, it is preferred that when the border portion is formed by two openings in the mask, the first opening in the mask border is a mirror-image of the second opening, relative to the center axis 5. It is also preferred that a border line between the border portion corresponding to the first opening from the border portion corresponding to the second opening is substantially uniform, smooth and monotonic.

The use of the present invention to control the twist angle and the pretilt angle of a liquid crystal is applicable to single ion source system as well as multiple ion source systems. As can be appreciated by those skilled in the art, the application of the present invention to multiple beam exposures through the same ion beam source may be accomplished by adjusting the relative positions of the substrate and/or ion beam source such that the first ion beam source 1 becomes the second ion beam source 2 (refer to FIG. 7).

Figure 9:
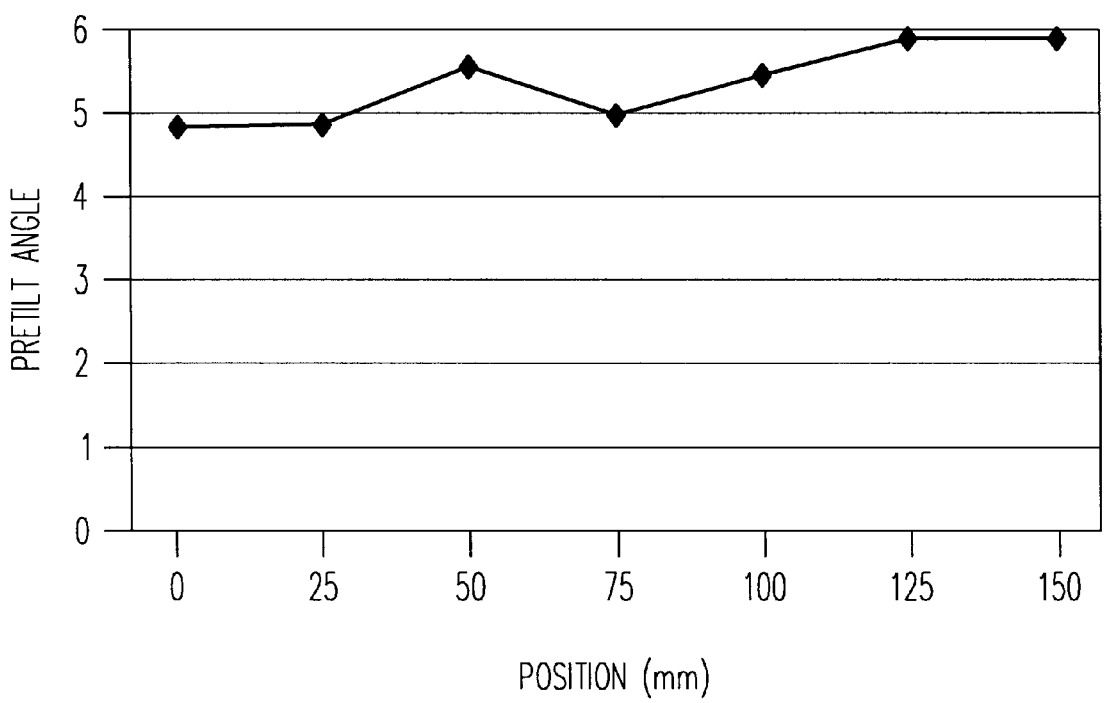
FIG. 9 is a graph illustrating pretilt angle versus position across a liquid crystal display cell made according to the present invention having an mask overlap portion of 60 mm to 100 mm with 20 mm spacing.

Reference is made to FIG. 9, which displays the measured pretilt angle uniformity across a liquid crystal cell that is made according to the present invention, and includes the overlap region at 60 mm to 100 mm. As shown in FIG. 9, within experimental error, the pretilt is uniform across the cell. The data illustrated in FIG. 9 demonstrates that liquid crystal cells which rely on a twisted nematic structure and which are made according to the present invention, have improved uniformity in the border area of overlap which has been heretofore unknown.

Figure 10:
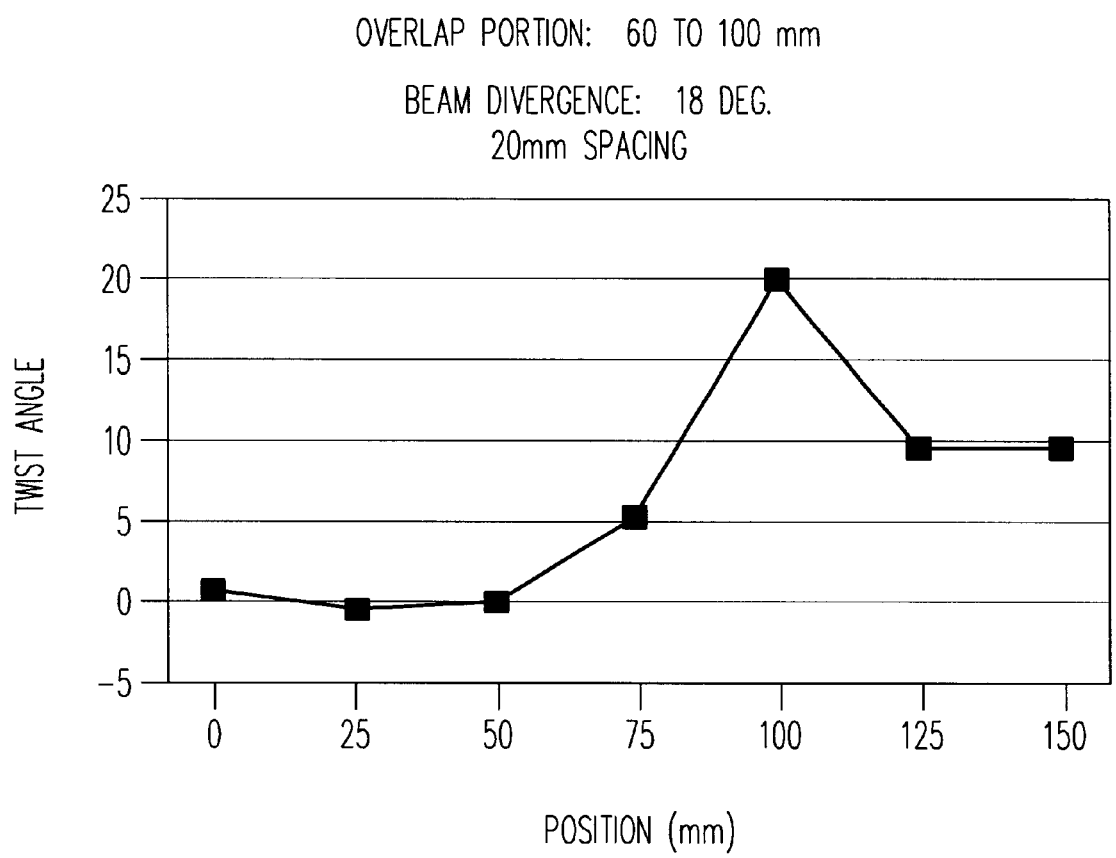
FIG. 10 is a graph illustrating twist angle versus position across the liquid crystal display cell of FIG. 9 having beam divergence angle of 18 degrees.

There are liquid crystal display cell arrangements where, in addition to uniformity of the pretilt angle across the liquid crystal display cell, the uniformity of the twist angle across the liquid crystal display cell is also important. The pretilt angle is the amount of tilt of the rod shaped liquid crystal molecules relative to the surface of a substrate, whereas the twist angle measures the deviation of the alignment direction of the liquid crystal molecules from a desired direction. For example, in some display applications it is desirable to have the liquid crystal molecules parallel to each other. The foregoing is obtained by making the alignment direction parallel. However, if the beam has a finite divergence, at the end of the gun, a component of the beam which is parallel to the long axis of the ion source gun induces an alignment direction at an angle away from the parallel direction. If two ion source guns then overlap, the net result is a variation of the angle of alignment. Such a variation in twist angle as a function of position in the cell is illustrated in FIG. 10. The large peak represents the spatial variation at the overlap region of the two ion source guns.

Figure 11:
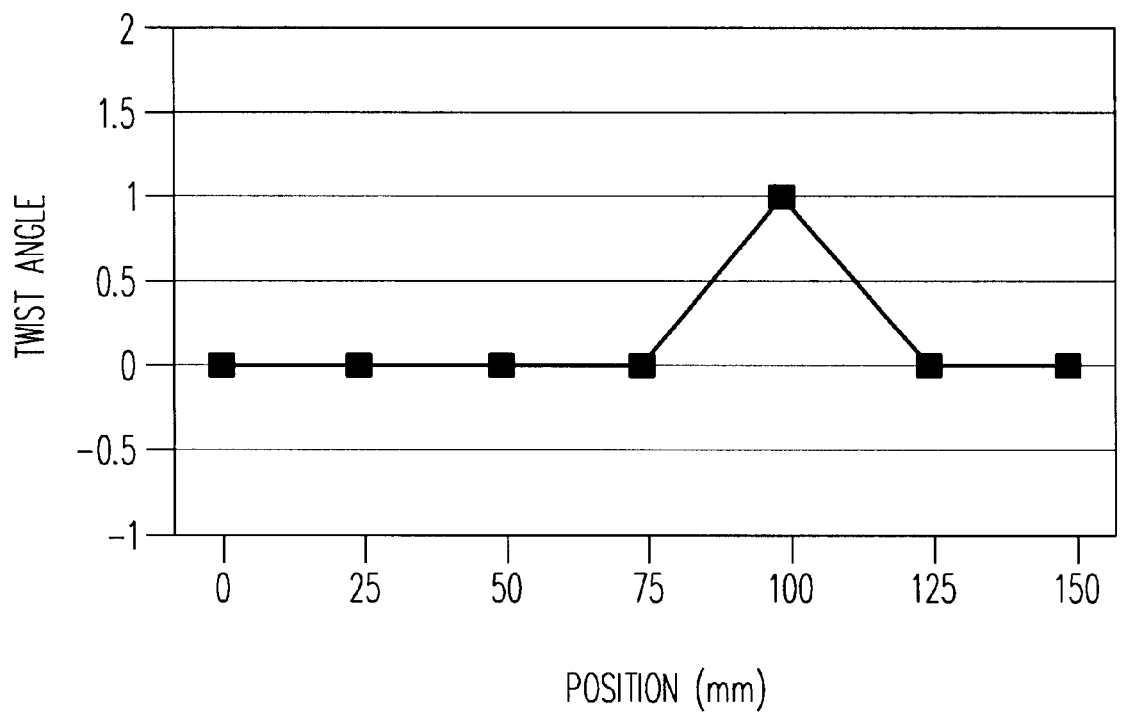
FIG. 11 is a graph illustrating simulation of the twist angle obtained when the spacing between the substrate and the mask is 5 mm and the beam divergence angle is 8 degrees.

This spatial variation illustrated in FIG. 10 can be decreased by reducing the divergence of the ion gun and adjusting the distance between the mask and the substrate. For example, if the beam divergence is reduced to 8 deg. and the spacing to 5 mm, the twist angle is reduced from the value of 20 deg. shown in FIG. 10 to within 1 degree (See FIG. 11). A twist angle within 1 degree is well within what can be tolerated for commercial liquid crystal display applications.

Various modifications and alterations to the present invention may be appreciated upon a review of this disclosure. These changes and additions are intended to be within the scope and spirit of the present invention as defined by the following claims.

What is claimed is:

1. An apparatus for forming an alignment layer for use in a liquid crystal cell comprising:

a holder for positioning a substrate having a surface with a border portion;

a plurality of ion beam sources disposed in a concatenated arrangement at a distance from said surface for producing an ion beam having a length;

a mask layer disposed between said surface and said plurality of ion beam sources, said mask layer having a first opening and a second opening, each having a length that is smaller than length of said ion beam;

wherein said first and second openings are shaped to enhance uniformity of surface exposure to said ion beam in said border portion by minimizing exposure of said surface to divergent ion beams formed at the edges of said ion beam.

2. The apparatus of claim 1, wherein said plurality of ion beam sources comprise a first ion beam source and a second ion beam source, and said first opening exposes said surface to said first ion beam source and said second opening exposes said surface to said second ion beam source.

3. The apparatus of claim 1, wherein said first and said second openings are symmetrical.

4. The apparatus of claim 1, wherein a portion of said first opening and a portion of said second opening substantially correspond to a triangle.

5. The apparatus of claim 1, wherein a portion of said first opening and a portion of said second opening are each comprised of a smooth curve.

6. The apparatus of claim 1, wherein a portion of said first opening and a portion of said second opening substantially correspond to a sine curve.

7. The apparatus of claim 1, wherein a portion of said first opening and a portion of said second opening substantially correspond to a Gaussian curve.

* * * * *